United States Patent [19]

Knollmueller

[11] Patent Number: 5,034,202
[45] Date of Patent: Jul. 23, 1991

[54] REMOVAL OF THIOSULFATE FROM HYDROSULFITE SOLUTIONS

[75] Inventor: Karl O. Knollmueller, Hamden, Conn.

[73] Assignee: Olin Corporation, Cheshire, Conn.

[21] Appl. No.: 632,257

[22] Filed: Dec. 21, 1990

[51] Int. Cl.$^5$ ................................................ C01D 5/16
[52] U.S. Cl. ................................ 423/181; 423/512 A; 423/515; 423/517
[58] Field of Search ..................... 423/181, 512 A, 514, 423/515, 517, 566.2

[56] References Cited

U.S. PATENT DOCUMENTS

| | | | |
|---|---|---|---|
| 3,216,791 | 11/1965 | Hansley et al. | 423/100 |
| 3,523,069 | 8/1970 | Oloman | 204/92 |
| 3,961,034 | 6/1976 | Bostian et al. | 423/181 |
| 4,157,980 | 6/1979 | Tiethof | 252/188 |
| 4,590,058 | 5/1986 | Cawlfield | 423/515 |

OTHER PUBLICATIONS

F. Foerster and E. T. Mommsen, Chem. Ber. 57, pp. 258-263 (1924); Chem. Abstracts 18,1254 (1924).

Primary Examiner—Theodore Morris
Assistant Examiner—P. L. Hailey
Attorney, Agent, or Firm—James B. Haglind; Paul Weinstein

[57] ABSTRACT

A process for treating an alkali metal hydrosulfite solution which comprises contacting the alkali metal hydrosulfite solution, having a residual alkalinity of from about 1 to about 20 grams per liter of hydroxide ion, with aluminum. The process of the invention can be operated at low temperatures i.e., those which are normally used for storage of the sodium hydrosulfite solution to minimize thermal decomposition.

17 Claims, No Drawings

REMOVAL OF THIOSULFATE FROM HYDROSULFITE SOLUTIONS

BACKGROUND OF THE INVENTION

This invention relates to alkali metal hydrosulfite solutions. More specifically, this invention relates to alkali metal hydrosulfite solutions containing reduced amounts of undesirable impurities.

DESCRIPTION OF THE PRIOR ART

Alkali metal hydrosulfites are commercially available bleaching agents which are particularly suitable for use in the pulp, textile, and clay industries.

While available in the anhydrous form, alkali metal hydrosulfites (dithionites) are advantageously used as a solution. Solutions of sodium hydrosulfite are used commercially for the bleaching of thermomechanical pulp and recycled deinked paper. This reductive bleaching with sodium hydrosulfite is preferred over oxidative bleaching processes using active oxygen or chlorine compounds. Bleaching with hydrogen peroxide as a source of active oxygen is more expensive and does not give superior increases in brightness. Pulp bleaching with chlorine or its derivatives requires a different chemical pretreatment and, because in using them environmentally objectionable halogenated organics are formed, these bleaching processes have come under increased scrutiny.

The reaction products formed in the reductive bleaching with hydrosulfites are much less objectionable, especially in continuous processes which recycle plant streams. All products present in effluents are ultimately converted to harmless sulfates by direct air oxidation or bacterial conversion processes.

Sodium hydrosulfite bleach solutions are produced by various processes, but all involve the reduction of sodium bisulfite solutions at pH levels around 6. In a specially designed electrolytic cell used in electrolytic processes, the reducing agents can be sodium amalgam or other selected metal cathodes. In chemical processes suitable reductants are sodium borohydride, zinc metal, or alkali metal formates. After the reduction step, the alkalinity of the product solution is adjusted upward to a pH above 9. This is commonly accomplished by the addition of between 1 and 6 grams/liter of an alkali metal hydroxide such as sodium hydroxide.

During the manufacture of hydrosulfite bleaches, sodium thiosulfate is one by-product formed. It is objectionable to the end users (paper mills) because, in bleaching processes currently used, it will cause corrosion of plant equipment.

In commercial processes used to produce sodium hydrosulfite solutions, the sodium thiosulfate level in the final product is between 2 and 10 grams/liter. The maximum currently acceptable sodium thiosulfate content by most paper mills is around 2 grams/liter in the solution delivered as product. This level can be partially achieved, for example, by crystallization of the sodium hydrosulfite as its dihydrate and redissolving the dihydrate in a hydrosulfite slip stream. However, this approach also leaves an effluent enriched in sodium thiosulfate for re-use or disposal.

A removal or destruction process for thiosulfate ions in sodium hydrosulfite solutions is therefore desirable to achieve acceptable sodium thiosulfate levels in hydrosulfite bleaches, levels which may be further reduced by, for example, the pulp and paper industry. One process which is available to destroy thiosulfate ions in sodium dithionite solutions, proceeds according to equation 1:

$$Na_2S_2O_3 + Na_2S_2O_4 + 4NaOH \rightarrow Na_2S + H_2O + 3Na_2SO_3 \quad (1)$$

In this process, sodium dithionite is the reducing agent and high concentrations of alkali, up to 1 molar or greater, are used, and the alkali treatment should be carried at around $+30°$ C. for several hours. The disadvantage of this process is that there is still a large excess of alkali present in the hydrosulfite solution. This alkalinity may have to be reduced to optimize the product solution when used, for example, for pulp bleaching. Also, some additional decomposition of hydrosulfite by the alkali may take place and further reduce the hydrosulfite concentration, proceeding via Eq. 2.

$$3Na_2S_2O_4 + 6NaOH \rightarrow Na_2S + 5Na_2SO_3 + 3H_2O \quad (2)$$

Reducing agents such as sodium borohydride reduce bisulfite to hydrosulfite, but do not act on the sulfite ion present in an alkaline medium. Under alkaline conditions where hydrosulfite is stable, most reducing agents leave thiosulfate unchanged.

Now it has been found that thiosulfate ions can be destroyed in a process for treating an alkali metal hydrosulfite solution which comprises contacting the alkali metal hydrosulfite solution, having an alkalinity of from about 1 to about 20 grams per liter of hydroxide ion, with aluminum.

DETAILED DESCRIPTION OF THE INVENTION

The novel process of the present invention employs as one reactant an aqueous solution of an alkali metal hydrosulfite having undesirable concentration levels of thiosulfate ions. Suitable alkali metal hydrosulfites include sodium hydrosulfite, potassium hydrosulfite, lithium hydrosulfite, and mixtures thereof. For the sake of simplicity, the process of the invention will be described using sodium hydrosulfite as the alkali metal hydrosulfite. Sodium hydrosulfite solutions treated by the process of the invention contain thiosulfate ion. Typically these solutions contain concentrations of at least 1 gram per liter of hydrosulfite, and usually from about 4 to about 12 grams per liter of hydrosulfite, depending on the manufacturing process used. As commercial products, they contain from about 80 to about 160 grams per liter of sodium hydrosulfite. A residual alkalinity of from about 1 to about 20, preferably from about 4 to 12, and more preferably from about 6 to about 8 grams per liter is initially present in the sodium hydrosulfite solution. The residual alkalinity stabilizes the solution and provides reserves for neutralization of hydrogen sulfite and bisulfite which may be formed. In a preferred embodiment, the residual alkalinity is maintained at a suitable level during the reaction by the addition of an alkaline compound such as sodium hydroxide. The residual alkalinity can be determined, for example, by admixing 1 ml. of the hydrosulfite solution in 100 mls. of de-aerated water and titrating the solution with hydrochloric acid to a pH of 9.2.

To reduce the thiosulfate concentration of these solutions, they are contacted with aluminum. The aluminum is preferably employed in metal form. Decomposition of thiosulfate ions is believed to be represented by the overall reaction shown by Equation 3:

$$2Al + 3Na_2S_2O_3 + 6NaOH + 3H_2O \rightarrow 3Na_2SO_3 + 3Na_2S + Al(OH)_3 \qquad (3)$$

As long as the alkalinity of the hydrosulfite solution is above about 2 grams per liter, the hydrosulfite solution is clear. At lower alkalinities formation of sodium aluminates may occur in a reaction believed to be represented by Equation 4:

$$Al(OH)_3 + (3-x)NaOH \rightarrow Na_{(3-x)}Al(OH)_{(6-x)} \qquad (4)$$

wherein x=0,1,2 or 3

If the thiosulfate ion concentration is depleted, an undesirable side reaction which decomposes hydrosulfite ions may compete. This decomposition reaction is believed to proceed according to Eq. 2 above, or involve a reductive step illustrated by Eq. 5:

$$4Al + 3Na_2S_2O_4 + 6NaOH \rightarrow 3Na_2S + 3Na_2SO_3 + 4Al(OH)_3 \qquad (5)$$

This decomposition takes place slowly so that the hydrosulfite concentration is not reduced to levels which would impair applications of the product solution.

Surprisingly, the process of the invention takes place at low temperatures i.e., those which are normally used for storage of the sodium hydrosulfite solution to minimize thermal decomposition. Suitable reaction temperatures include those in the range of from about $-10°$ to about 25° C., preferably at from about $-5°$ to about $+5°$ C., and more preferably at from about $-2°$ to about $+2°$ C.

It has been found that the reaction of Al with thiosulfate ion is a 0 order reaction in which the reaction rates are directly dependent on the surface area. While any form of aluminum may be used, aluminum dust or foil are preferred forms of the metal. It is desirable to minimize the presence of aluminum oxide as it delays the initial reaction time. The oxide is removed by the alkalinity present in the hydrosulfite solution.

In a preferred embodiment, the sulfide ions formed by the decomposition of the thiosulfate ions are removed from the hydrosulfite product solution. This can be readily accomplished, for example, by the addition of a metal salt capable of forming an insoluble sulfide. Salts of zinc, lead or iron are suitable with the sulfate being preferred, however, oxides, hydroxides and carbonates can also be used although the reaction time is increased. Using a sulfate as the reactant, the sulfide removal reaction is believed to be illustrated by the following equation:

$$MSO_4 + Na_2S \rightarrow MS + Na_2SO_4 \qquad (6)$$

where M represents a bivalent metal ion.

While the process of the invention has been described using aluminum to remove thiosulfate ions from alkali metal hydrosulfite solutions, it will be understood that gallium and indium can also be employed.

The process of the present invention is further illustrated by the following Examples, with no intention of being limited thereby. All parts and percentages are by weight unless otherwise indicated.

EXAMPLES 1-3

To each of 3 bottles containing a magnetic stir bar was added 100 mls. of a sodium hydrosulfite solution. The composition of each solution is given in Table I below. Powdered aluminum was added to each bottle and the bottles sealed and placed into a jacketed beaker placed on a magnetic stirrer. Through the jacketed beaker a glycol-water mixture was circulated to maintain the temperature of the reaction mixture at around 0° C. During the initial stages of the reaction, there was some hydrogen evolution which is indicative of the dissolution reaction of aluminum in the alkali solution. The pressure buildup in the sealed bottles during the reaction period was slight. The reaction was allowed to proceed for 12 hours. A sample of each sodium hydrosulfite solution was taken for analysis employing a nitrogen atmosphere during the removal and handling to prevent oxidation of the hydrosulfite by air. Sulfide ion concentrations and thiosulfate concentrations in the solutions were determined by ion chromatography. The results are recorded in Table I below. Following the determination of the sulfide concentrations, the solutions were treated with a metal salt in an amount corresponding to the sulfide concentration to remove the sulfide formed as a precipitate. To the solution of Example 1, zinc sulfate was added; zinc carbonate was added to the solution of Example 2; and lead sulfate was added to the solution of Example 3.

EXAMPLES 4-6

The method of Examples 1-3 was repeated exactly using 0.4 grams of aluminum foil (surface area: 482 cm$^2$/g)) as the reactant and lead sulfate as the precipitant for sulfide. The results are recorded in Table I below.

EXAMPLES 7-8

The method of Examples 1-3 was employed using 0.5 grams of aluminum foil as the reactant, a reaction period of 5 hours, and lead sulfate as the precipitant for sulfide ions. The sulfide ion concentration in the treated hydrosulfite solutions was not determined. The results are recorded in Table 1 below.

Examples 1-8 show that the process of the invention results in significant reduction in sodium thiosulfate concentrations in concentrated sodium hydrosulfite solutions.

EXAMPLE 9

The method of Examples 1-3 was repeated using 100 mls. of sodium hydrosulfite having an alkalinity residual of about 9 g/l and 0.3 g. of aluminum foil with two exceptions. The first exception being that the analysis of the solution for thiosulfate ions and sulfide ions was carried out each hour during the reaction period. The second exception to the method was the omission of the addition of a metal salt as a precipitant. The results are reported in Table II below:

TABLE II

| Time Minutes | GPL Na$_2$S$_2$O$_4$ present | GPL Na$_2$S$_2$O$_3$ present | GPL Na$_2$SO$_3$ present | GPL Na$_2$S present |
|---|---|---|---|---|
| 0 | 131.32 | 7.43 | 73.60 | 0.46 |
| 60 | 124.84 | 6.97 | 69.40 | 2.04 |
| 120 | 127.05 | 6.27 | 79.43 | 6.04 |
| 180 | 126.80 | 3.93 | 87.39 | 8.06 |
| 240 | 127.43 | 3.12 | 97.68 | 14.29 |

EXAMPLE 10

The method of Example 9 was repeated exactly with the exception that 1 g. of powdered aluminum was used as the reactant. Table III below reports the results obtained:

TABLE III

| Time Minutes | GPL $Na_2S_2O_4$ present | GPL $Na_2S_2O_3$ present | GPL $Na_2SO_3$ present | GPL $Na_2S$ present |
|---|---|---|---|---|
| 0 | 131.32 | 7.43 | 73.00 | 0.46 |
| 60 | 127.5 | 4.37 | 84.31 | 6.79 |
| 120 | 122.78 | 1.93 | 94.33 | 11.56 |
| 180 | 126.45 | 1.41 | 101.01 | 14.56 |
| 240 | 120.77 | 0.01 | 108.99 | 18.4 |

TABLE I

| Example Number | Na Dithionite grams/liter before | Na Thiosulfate grams/liter before react. | Na Hydroxide grams/liter before react. | Aluminum grams | Na Thiosulfate grams/liter after react. | Na Sulfide grams/liter after react. | Na Dithionite grams/liter after workup | Precipitant |
|---|---|---|---|---|---|---|---|---|
| 1 | 127.00 | 12.25 | 9.05 | Powder .8 g | 1.16 | 14.67 | 112.00 | ZnSO4 |
| 2 | 126.80 | 12.10 | 14.09 | Powder .7 g | 2.60 | 6.14 | 114.98 | ZnCO3 |
| 3 | 126.60 | 12.60 | 14.09 | Powder .4 g | 1.13 | 10.92 | 110.41 | PbSO4 |
| 4 | 130.00 | 2.41 | 10.40 | Foil .4 g | 0.20 | 6.04 | 117.60 | PbSO4 |
| 5 | 117.00 | 8.30 | 10.06 | Foil .4 g | 3.50 | 5.80 | 108.00 | PbSO4 |
| 6 | 117.00 | 8.30 | 10.06 | Foil .4 g | 2.10 | 6.54 | 105.00 | PbSO4 |
| 7 | 130.79 | 9.46 | 9.53 | Foil .5 g | 1.80 | not done | 112.49 | PbSO4 |
| 8 | 131.25 | 4.09 | 9.00 | Foil .5 g | 0.00 | not done | 111.70 | PbSO4 |

What is claimed is:

1. A process for treating an alkali metal hydrosulfite solution which comprises contacting the alkali metal hydrosulfite solution with aluminum, the alkali metal hydrosulfite solution having a residual alkalinity of from about 1 to about 20 grams per liter of hydroxide ion.

2. The process of claim 1 in which the alkali metal hydrosulfite is selected from the group consisting of sodium hydrosulfite, potassium hydrosulfite, lithium hydrosulfite, and mixtures thereof.

3. The process of claim 2 in which the contacting is at a temperature in the range of from about $-10°$ to about $+25°$ C.

4. The process of claim 3 in which the alkali metal hydrosulfite solution has an initial thiosulfate ion concentration of at least about 1 gram per liter.

5. The process of claim 1 in which the source of hydroxide ion is an alkali metal hydroxide, an alkaline earth metal hydroxide or mixtures thereof.

6. The process of claim 5 in which the source of hydroxide ion is an alkali metal hydroxide selected from the group consisting of sodium hydroxide, potassium hydroxide, lithium hydroxide, and mixtures thereof.

7. The process of claim 6 in which the alkali metal hydrosulfite solution is sodium hydrosulfite.

8. The process of claim 7 in which the source of hydroxide ion is sodium hydroxide.

9. The process of claim 8 in which the alkali metal hydrosulfite solution has a residual alkalinity of from about 4 to about 12 grams per liter of hydroxide ion.

10. A process for removing thiosulfate ions from an aqueous solution of alkali metal hydrosulfite which comprises treating the alkali metal hydrosulfite solution, having a residual alkalinity of from about 1 to about 20 grams per liter of hydroxide ion, with aluminum in a reaction mixture to convert the thiosulfate ions to sulfide ions, removing the sulfide ions, and recovering an aqueous solution of alkali metal hydrosulfite having a reduced concentration of thiosulfate ions.

11. The process of claim 10 in which the alkali metal hydrosulfite is selected from the group consisting of sodium hydrosulfite, potassium hydrosulfite, lithium hydrosulfite, and mixtures thereof.

12. The process of claim 11 accomplished by maintaining the reaction mixture at a temperature in the range of from about $-10°$ to about $+25°$ C.

13. The process of claim 12 in which the aqueous solution of alkali metal hydrosulfite has an initial thiosulfate ion concentration is at least about 1 gram per liter.

14. The process of claim 12 accomplished by employing as the source of hydroxide ion an alkali metal hydroxide selected from the group consisting of sodium hydroxide, potassium hydroxide, lithium hydroxide, and mixtures thereof.

15. The process of claim 12 wherein removing the sulfide ions is accomplished by reacting the sulfide ions in the reaction mixture with a metal salt to form an insoluble metal sulfide.

16. The process of claim 15 wherein removing the sulfide ions is accomplished by reacting the sulfide ions in the reaction mixture with a salt of a metal selected from the group of zinc, lead, ferrous iron, and mixtures thereof.

17. The process of claim 16 in which the metal salt is a metal sulfate.

* * * * *